United States Patent [19]

Brewer, III et al.

[11] Patent Number: 5,333,252
[45] Date of Patent: Jul. 26, 1994

[54] INTERFACE FOR ARRANGING ORDER OF FIELDS

[75] Inventors: Glenn A. Brewer, III, Menlo Park; Christopher L. Crim, San Jose; Paul S. Chen; Frank K. Lu, both of Milpitas, all of Calif.

[73] Assignee: Claris Corporation, Santa Clara, Calif.

[21] Appl. No.: 86,195

[22] Filed: Jun. 30, 1993

Related U.S. Application Data

[63] Continuation of Ser. No. 504,876, Apr. 5, 1990, abandoned.

[51] Int. Cl.⁵ .............................................. G06F 15/40
[52] U.S. Cl. .................................... 395/148; 395/600
[58] Field of Search ................ 395/148, 153, 155, 600

[56] References Cited

U.S. PATENT DOCUMENTS 4,939,689  7/1990  Davis et al. ........................ 364/900

Primary Examiner—Heather R. Herndon
Assistant Examiner—Joseph H. Feild
Attorney, Agent, or Firm—Blakely, Sokoloff Taylor & Zafman

[57] ABSTRACT

A method and apparatus of corresponding the order of fields from a first data set to the order of fields in a second data set is provided by displaying the fields from a first record in the first data set on a display. Then, a first field name from the second data set is displayed to correspond with a first field from the first record in the first data set. The position on the display of the first field name from the second data set is then rearranged to correspond with a second field from the first record in the first data set.

5 Claims, 23 Drawing Sheets

EMPLOYEES 100

| Social Security No. 101 | Name 102 | Position 103 | Address 104 | City 105 | State 106 | Zip 107 | Salary 108 | Party 109 |
|---|---|---|---|---|---|---|---|---|
| 151→ 092-29-1832 | Baker, James | Secretary of State | 5643 Route 1 | Alexandria | VA | 39202 | 90,000 | Republican |
| 152→ 0998-09-2843 | Boxer, Barbara | Congressman | 1084 Georgia Ave. | Silver Spring | MD | 20910 | 80,000 | Democratic |
| 153→ 000-00-0001 | Bush, George | President | 1600 Pennsylvania Ave., NW | Washington | DC | 20231 | 200,000 | Republican |
| 803-29-9037 | Cheney, Richard | Defense Secretary | 2390 Canal Street, NW | Washington | DC | 28932 | 90,000 | Republican |
| 980-83-2892 | Cranston, Alan | Senator | 9234 Duke Street | Alexandria | VA | 30438 | 90,000 | Democratic |
| 103-10-3802 | Dole, Robert | Senate Minority Leader | 10344 Chain Bridge Road | Vienna | VA | 23310 | 90,000 | Republican |
| 203-00-1032 | Foley, Thomas | Senate Majority Leader | 1000 Connecticut Avenue | Chevy Chase | MD | 30438 | 90,000 | Democratic |
| 019-34-8902 | Michel, Robert | House Minority Leader | 15043 Leesburg Pike | Fairfax | VA | 33012 | 80,000 | Republican |
| 000-00-0003 | Mitchell, George | Speaker of the House | 1400 Wisconsin Avenue | Bethesda | MD | 20901 | 90,000 | Democratic |
| 209-20-2903 | Nunn, Samuel | Senator | 3982 P Street, NW | Washington | DC | 22310 | 95,000 | Democratic |
| 0998-09-9900 | O'Connor, Sandra Day | Associate Justice | 10935 M Street, NW | Washington | DC | 23021 | 80,000 | NA |
| 093-09-2384 | Pelosi, Nancy | Congressman | 1903 Dupont Circle, NW | Washington | DC | 20220 | 80,000 | Democratic |
| 000-00-0002 | Quayle, Dan | Vice-President | 2001 Massachusetts Ave., NW | Washington | DC | 20220 | 150,000 | Republican |
| 091-23-2853 | Rehnquist, William | Chief Justice | 1343 Eye Street, NW | Washington | DC | 23021 | 90,000 | NA |
| 830-83-2903 | Schroder, Patricia | Congressman | 3820 River Road | Potomac | MD | 20398 | 80,000 | Democratic |
| 893-02-8234 | Wilson, Pete | Senator | 3982 New York Ave | Lanham | MD | 20392 | 90,000 | Republican |

*Fig. 1*

Specify field order for import

Data In: "Employees-Text"    Fields In: "Insurance"

| | |
|---|---|
| 092-29-1832 → | Name |
| Baker, James → | Social Security Number |
| Secretary of State → | Address |
| 1003 ——→ 5643 Route 1 → | City    ←——1004 |
| Alexandria → | State |
| VA → | Zip |
| 39202 → | Position |
| 90,000 → | Spouse |
| Republican → | Other Dependents |
| ┈▶ | YTD Deductible |

↖——305

[<<] Scan Data [>>] Record 1    1005

● Add new records    1001          1002    [ Cancel ]

○ Replace data in current found set              [ OK ]

Specify field order for import

| Data In: "Employees-Text" | Fields In: "Insurance" |
|---|---|
| 098-09-2843 → | Name |
| Boxer, Barbara → | Social Security Number |
| Congressman → | Address |
| 1084 Georgia Avenue, N.W. → | City |
| Silver Spring → | State |
| MD → | Zip |
| 20910 → | Position |
| 80,000 → | Spouse |
| Democrat → | Other Dependents |
|  ⇢ | YTD Deductible |

1103 →   ← 1004

1102  •1101

[<<] Scan Data [>>]  Record 2
 ←305   1001  1002

⦿ Add new records
◯ Replace data in current found set

[ Cancel ]
[  OK  ]

Specify field order for import

| Data In: "Employees-Text" | Fields In: "Insurance" |
|---|---|
| 1203 → 092-29-1832 → | Name |
| 1204 → Baker, James → | Name |
| Secretary of State → | Address |
| 5643 Route 1 → | City |
| Alexandria → | State   1201 |
| VA → | Zip |
| 39202 → | Position |
| 90,000 → | Spouse |
| Republican → | Other Dependents |
|  ⇢ | YTD Deductible |

[<<] Scan Data [>>]  Record 1

⦿ Add new records    1001            1002    [ Cancel ]
○ Replace records in current found set        [   OK   ]

*Fig. 13*    1300

Specify field order for import

Data In: "Employees-Text"          Fields In: "Insurance"

| | |
|---|---|
| 1203 → 092-29-1832 → | Social Security Number |
| 1204 → Baker, James → | Name |
| Secretary of State → | Address |
| 5643 Route 1 → | City |
| Alexandria → | State  1201 |
| VA → | Zip |
| 39202 → | Position |
| 90,000 → | Spouse |
| Republican → | Other Dependents |
| ⋯→ | YTD Deductible |

305

[<<] Scan Data [>>] Record 1

● Add new records          1001          1002
○ Replace records in current found set Cancel

Specify field order for import

Data In: "Employees-Text"  Fields In: "Insurance"

```
                092-29-1832  → Social Security Number
                Baker, James → Name
   1503 → Secretary of State → Address ← 1504
       1506 → 5643 Route 1   → City
                  Alexandria → State                    1505
                          VA → Zip ← 1507
       1502 → 39202          → Position
                      90,000 → Spouse
                  Republican → Other Dependents
                             → YTD Deductible            1501
```

[<<] Scan Data [>>]  Record 1
                        1001                1002      [Cancel]

⦿ Add new records
○ Replace records in current found set          [ OK ]

*Fig. 15*   1500

Specify field order for import

Data In: "Employees-Text"  Fields In: "Insurance"

| | |
|---|---|
| 092-29-1832 → | Social Security Number |
| Baker, James → | Name |
| 1503 ──→ Secretary of State → | Address ←── 1504 |
| 1506 ──→ 5643 Route 1 → | City |
| Alexandria → | State   1505 |
| VA → | Position |
| 1502 ──→ 39202 → | Position |
| 90,000 → | Spouse |
| Republican → | Other Dependents   1501 |
| ⋯→ | YTD Deductible |

[<<] Scan Data  [>>] Record 1

1001   1002   Cancel

● Add new records
○ Replace records in current found set   OK

*Fig. 16*   1600

Specify field order for import

Data In: "Employees-Text"　　　　Fields In: "Insurance"

| | |
|---|---|
| 092-29-1832 →| Social Security Number |
| Baker, James →| Name |
| 1503 →Secretary of State →| Position |
| 1506 →5643 Route 1 →| City |
| Alexandria →| State |
| VA →| Zip ←1507 |
| 1502 →39202 →| Address ←1504 |
| 90,000 →| Spouse |
| Republican →| Other Dependents |
| ⋯→| YTD Deductible |

1501

↑ 1001　　↑ 1002

[<<] Scan Data [>>] Record 1

● Add new records
○ Replace records in current found set

[ Cancel ]
[ OK ]

*Fig. 17*　　1700

Specify field order for import

Data In: "Employees-Text"  Fields In: "Insurance"

```
              092-29-1832   → Social Security Number
              Baker, James  → Name
1503 ──→ Secretary of State → Position ←──1501
1506 ──→ 5643 Route 1       → Address ←──1504
              Alexandria    → City
              VA            → State
1502 ──→ 39202              → Zip ←──1507
              90,000        → Spouse
              Republican    → Other Dependents
                            ⇢ YTD Deductible
```

[<<] Scan Data [>>] Record 1
       1001              1002

● Add new records
○ Replace records in current found set

[ Cancel ]
[ OK ]

*Fig. 18*   1800

Specify field order for import

Data In: "Employees-Text"    Fields In: "Insurance"

| Data | | Fields |
|---|---|---|
| 092-29-1832 | → | Social Security Number |
| Baker, James | → | Name |
| Secretary of State | → | Position |
| 5643 Route 1 | → | Address |
| Alexandria | → | City |
| VA | → | State —— 1901 |
| 39202 | ⇢ | Zip —— 1902 |
| 1906 ——→ 90,000 | ⇢ | Spouse ← —— 1904 |
| 1907 ——→ Republican | ⇢ | Other Dependents —1903 |
| | ⇢ | YTD Deductible —1905 |

⇕ ←—305

[<<] Scan Data [>>] Record 1

◉ Add new records
○ Replace records in current found set

[ Cancel ]
[ OK ↙ ]

*Fig. 19*       1900       1910

INTERFACE FOR ARRANGING ORDER OF FIELDS

This is a continuation of application Ser. No. 07/504,876, filed Apr. 5, 1990, now abandoned.

BACKGROUND OF THE INVENTION

1. Field of the Invention

The present invention pertains to the field of user interfaces on computer controlled video display systems. More particularly, this invention relates to an efficient user interface for arranging the order of fields in one set of data so that they correspond with the specific order of fields in a second set of data for use with any application program, such as a database or a spread sheet program.

2. Background Information

Some computer application programs, such as database or spread sheet programs, require that data be arranged in a predetermined way. That arrangement may be meaningful for a particular data set. It is sometimes useful to be able to extract data from a first data set and input it into a second data set. Programs that work with given data sets sometimes provide a feature wherein data from one data set may be imported into a second data set. This importation avoids unnecessary duplication of effort which would occur by entering the data into the second data set as well as the first. In addition, these importation features allow a user to control the data in one data set (e.g. insure that the data is error-free) and import the data into the second data set while maintaining the integrity of the first data set.

Importation features on existing computer programs require that the user define which fields from the first data set will be "mapped" into the second data set. The user must know the order of the fields in the first data set, and the order of the corresponding fields in the second set. This information is needed before the fields can be "mapped" from one data set to another. In a typical prior art computer system this information is generally not available to the user at the time of field correspondence between the two data sets.

Referring to FIG. 1, an example of a database is shown. Database 100 is comprised of 9 fields: Social security number 101; Name 102; Position 103; Address 104; City 105; State 106; Zip 107; Salary 108; and Party 109, in that order. Database 100 is named "Employees" and comprises records 151, 152, 153, etc. each having fields associated with 101 through 109 above. The database 100 may be represented as a text file, wherein each of the fields is separated from the others within a record by tab stops in ASCII code. Separate records may be delineated, such as 151, 152, etc. . . . in database 100 by hard carriage returns in ASCII. Employee database 100 may also be represented in another file format such as one used by a spread sheet program such as EXCEL or LOTUS, or a database program such as FILEMAKER or DBASE.

An application such as a database program, may represent fields on a CRT screen display from a database in the manner shown in FIG. 2. As shown in FIG. 2, database 200 may be represented using the following fields: Name 201; Social Security Number 202; Address 203; City 204; State 205; Zip 206; Position 207; Spouse 208; Other Dependents 209; and YTD Deductible 210, in that order. The fields 201 through 210 as shown in database 200 may represent Insurance information, for example. It may be appreciated that some of the fields shown in Insurance database 200 may correspond with some of the fields shown in Employee database 100 of FIG. 1. For instance, name 102 of Employee database 100 may correspond with the name field 201 of Insurance database 200. Likewise social security number 101 of database 100 and social security number 202 of database 200 may correspond with one another. As discussed previously, certain fields from one data set such as database 100 may be "mapped" to correspond with some of the fields in database 200. After such "mapping," an importation may be accomplished, creating a new record in the second data set for each record in the first data set and copying each field from the first data set into fields in the second data set. This "mapping" operation is discussed with reference to FIG. 3.

A prior art user interface for defining the order in which fields from one data set may be imported into another is shown as screens 300 and 310 of FIGS. 3A and 3B. This prior art user interface is representative of an interface utilized by the FILEMAKER II version 1.0 database product available from CLARIS Corporation of Santa Clara, Calif. Screen 300 shows the list of the fields in the current data set, such as Insurance database 200 in FIG. 2, in window 301. Window 302 of screen 300 will show the order in which the fields of the current database may correspond with the order of the fields in the file being imported. If button 303 is selected by moving a pointer 305 to button 303 and "depressed" using an input device, then the input order as shown on 302 is the same as the field order in the current database. The result of selecting button 303 with cursor 305 is shown as screen 310 on FIG. 3B. As shown in window 302 of FIG. 3B, the input order of the fields is the same as the list shown in window 301, the order of the fields in Insurance database 201. When the input file is imported into Insurance database 200 as defined by screen 310, they will be read in the order shown in window 302. As shown on screen 400 of FIG. 4, the first record 151 of Employee database 100 has been read in the order as defined by importation screen 310 in FIG. 3B. 400 of FIG. 4 shows the results of copying these fields in the order defined in screen 310. As can be appreciated, the field order of the input Employee database 100 is different from that of Insurance database 200. As a result the social security number 101 from record 151 of FIG. 1 has been inserted in the name field 201 for Insurance database 200. Likewise social security number 202 of Insurance database 200 has been incorrectly matched with the name field of database 100, 102 of FIG. 1. The remainder of the fields in this record of Insurance database 200 are also incorrectly matched.

Another prior art method of mapping fields from one set of data to another is shown in FIG. 5. Instead of corresponding all of the fields from the current database with the same order of fields in the input file, a user may correspond individual fields in the input file in a particular order with those in the current database. This is accomplished in a manner shown with reference to screen 500. Window 501 of screen 500 shows the order of the field list, and individual fields are associated with a particular order by selecting each field to be corresponded in window 501. Then, the cursor 305 is pointed at button 504 by using a cursor control device and selected to copy the corresponding field name in window 501 of the input file to window 502. The process of highlighting items in window 501, and selecting the move button 504 with cursor 305 may be repeated until all of the field names or some of the field names have been copied from window 501 to window 502, showing a particular order. The result of such moving is shown in screen 600 of FIG. 6. Window 502 now reflects the order of the fields in the Employee database 100 as shown in FIG. 1. The user may now instruct the program to "import" the information from the input file such as Employee database 100 in FIG. 1, into the current Insurance database 200 by selecting button 606 with cursor 305, indicating that all of the fields have been mapped. Then, the program will read in each of the fields from the input file in the order defined in window 502. One record which results from this importation is shown in FIG. 7 as screen 700. As is shown in screen 700, each of the fields from the input database 100 of FIG. 1 is now in its appropriate position on Insurance database 200 because their order was properly defined in window 502 of screen 600. Field 102 of record 151 from Employee database 100 is now shown in field 201 of screen 700, field 101 of record 151 is now correctly associated with field 202 of Insurance database 200, and the position field 103 of record 151 of database 100 is now correctly associated with field 203 of the record shown on screen 700 of FIG. 7. It should be noted that in order to import fields in the correct order, the user must have some prior knowledge of the order of fields in input database 100. As can be appreciated from the foregoing discussion, the process of importing files from one data set (e.g. Employees database 100 of FIG. 1), to another data set (e.g. Insurance database 200 of FIG. 2), is an error-prone and time consuming task which may require several iterations of the process depending on the number of fields in each database and the extent of the user's knowledge about the input and the output files. It can be appreciated that an improved method is needed for representing the fields which may be associated from one set of data to another set of data.

In light of these limitations of known systems, it is desirable to have a system which provides information to the user regarding the arrangement of data in the first data set and the second data set at the time of field order definition. This will make the job of defining the corresponding fields between the two data sets much easier.

SUMMARY AND OBJECTS OF THE INVENTION

One object of the invention is to provide a convenient method for corresponding the orders of fields from one set of data to another.

This and other objects of the present invention are provided for by a method of corresponding the order of fields from a first data set to the order of fields in a second data set, by displaying the fields from a first record in the first data set on a display. A first field name from the second data set is displayed to correspond with a first field from the first record in the first data set. The position on the display of the first field name from the second data set is then rearranged to correspond with a second field from the first record in the first data set.

This and other objects of the present invention are provided for by an apparatus for corresponding the order of fields from a first data set to the order of fields in a second data set, comprising a means for displaying the fields from a first record in the first data set on a display, a means for displaying a first field name from the second data set to correspond with a first field from the first record in the first data set, and a means for rearranging the position on the display of the first field name from the second data set to correspond with a second field from the first record in the first data set.

These and other objects of the present invention are provided for by a method of corresponding the order of fields from a first data set to the order of fields in a second data set, by sequentially displaying the fields from a record in a first data set on a first portion of a display device and the field names from a second data set on a second portion of a display device. The second portion of the display device is adjacent to the first portion of the display device. Then, a first field name which is displayed at a first position on the second portion of the display device is selected, and moved to a second position on the display device. A second field name resides at the second position, so when the second field name is placed into the first position, the first field name is placed into the second position.

DESCRIPTION OF THE FIGURES

The present invention is illustrated by way of example and not limitation and the figures of the accompanying drawings in which like references indicate similar elements and in which:

FIG. 1 is a database which may be used in the prior art or the preferred embodiment of the present invention.

FIG. 10 shows an interface screen used in the preferred embodiment for importing one set of data to another set of data.

FIG. 11 shows a second screen which is used in the preferred embodiment for importing data from a first set of data to a second set of data.

FIG. 13 shows a second step in moving one field in a second set of data to correspond with another field from a first set of data.

FIG. 14 shows a third and final step to rearrange one field with respect to another.

FIG. 15 shows arranging another field from a first set of data to correspond with a second set of data.

FIG. 16 shows a second step in moving a second field with relation to a first set of data.

FIG. 17 shows a final step in rearranging a second field.

FIG. 18 shows how all of the fields may be rearranging to properly map data from a first data set to a second data set.

FIG. 19 shows how the mapping function for certain fields may be disabled for importing one set of data into a second set of data.

DETAILED DESCRIPTION OF THE PREFERRED EMBODIMENT

The present invention covers a method for arranging the order of fields in a computer system. In the following description, numerous specific details are set forth such as screen displays, cursor control devices, etc., in order to provide a thorough understanding of the present invention. It will be obvious, however, to one skilled in the art that these specific details may not be required to practice the present invention. In other instances, well-known components of computer systems have not been described in detail to not unnecessarily obscure the present invention.

Figure 8A:
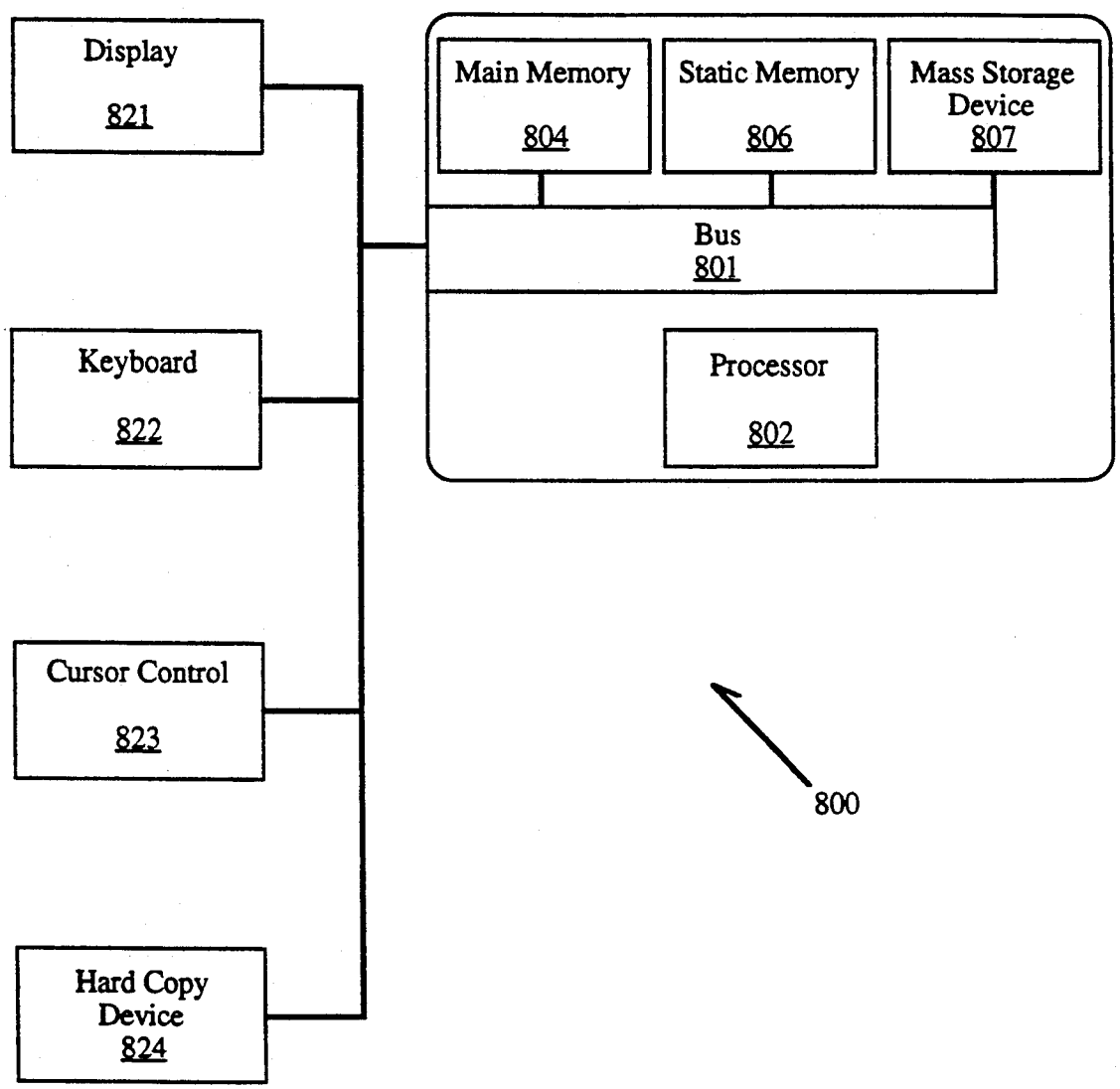
FIG. 8A shows the computer system which may be used in the preferred embodiment.

FIG. 8A illustrates computer system 800 upon which a preferred embodiment of the present invention is implemented. Computer system 800 comprises a bus or other communication means 801 for communicating information, a processing means 802 coupled with bus 801 for processing information, and a random access memory (RAM) or other dynamic storage device 804 (commonly referred to as main memory) coupled to bus 801 for storing information and instructions for processor 802. Computer system 800 also comprises a read only memory (ROM) or other static storage device 806 coupled to bus 801 for storing static information and instructions of the processor 802, a data storage device 807, such as a magnetic disk or optical disk and disk drive, coupled to bus 801 for storing information and instructions. Computer system 800 further comprises a display device 821, such as a cathode ray tube (37 CRT"), coupled to bus 801 for displaying information to the computer user, an alpha-numeric input device 822, including alpha numeric and other keys, coupled to bus 801 for communicating information and command selections to processor 802, and a cursor control device 823, such as a mouse, a track ball, or cursor direction keys, coupled to bus 801 for communicating direction information and command selections to processor 802 and for controlling said cursor movement. It is also useful if the system includes a hard copy device 824, such as a printer, for providing permanent copies of information on paper, film, or other physical media with which the user can visually examine information. The hard copy device 824 is coupled to the processor 802, main memory 804, static memory 806, and mass storage device 807 through bus 801.

Processor 802 in a preferred embodiment is a MOTOROLA 68000 microprocessor manufactured by MOTOROLA Corporation of Schamburg, Ill. In a preferred embodiment, the computer system 800 is one of the MACINTOSH family of personal computers, such as the MACINTOSH SE or MACINTOSH II, manufactured by Apple Computer of Cupertino, Calif.

Figure 8B:
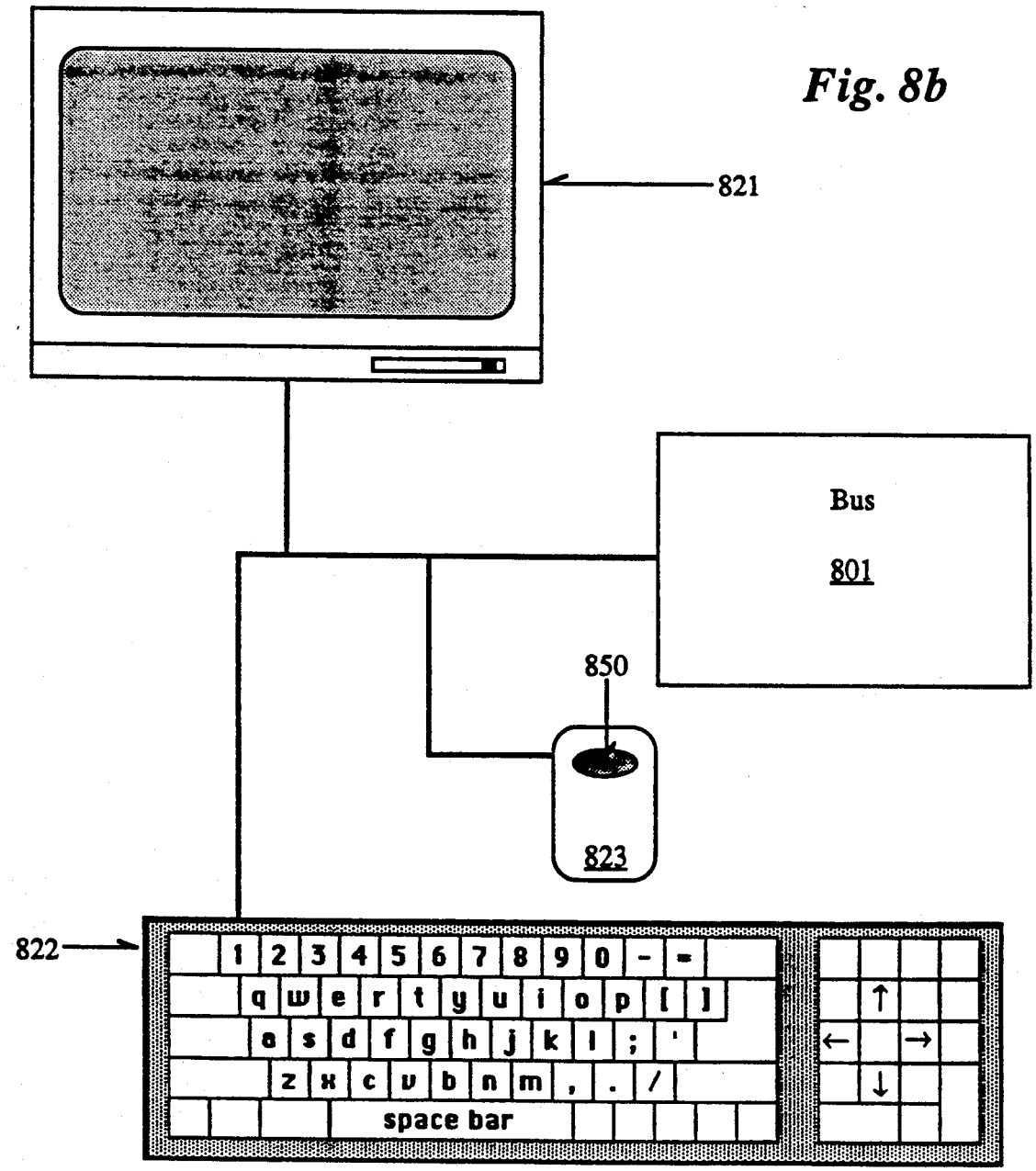
FIG. 8B shows a detailed representation of a portion of the computer system shown in FIG. 8A.

A detailed representation of a segment of the computer system 800 is shown in FIG. 8B. FIG. 8B shows the input device 823 as being a mouse, which is used for moving a pointer or cursor on display 821. Mouse 823 comprises a button 850, which is used for selecting given portions on a graphical display screen. In other words, if the cursor on the screen is moved to a given area on the display screen 821, and button 850 is depressed, then the program controlling the display screen may have a predetermined outcome, such as running a program, highlighting a portion of the screen, or another given operation. FIG. 8B also shows display 821 as a CRT and it shows a detailed representation of keyboard 822.

Figure 2:
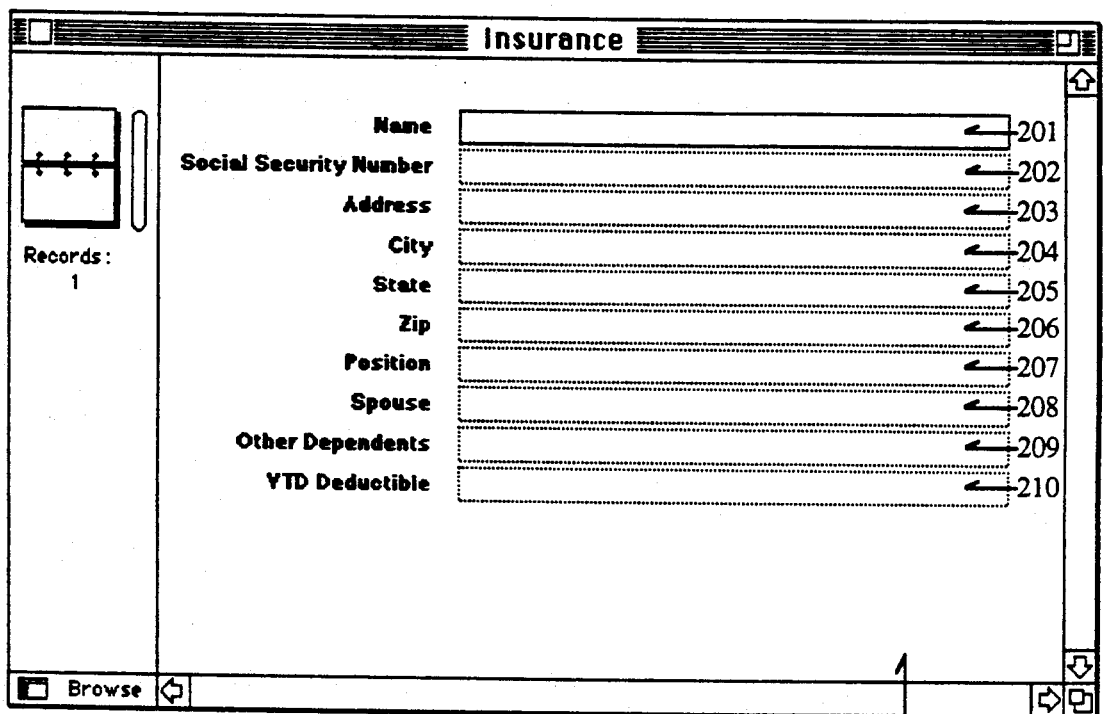
FIG. 2 shows a blank record from a prior art computer database with field names for each field in the database.
Figure 3A:
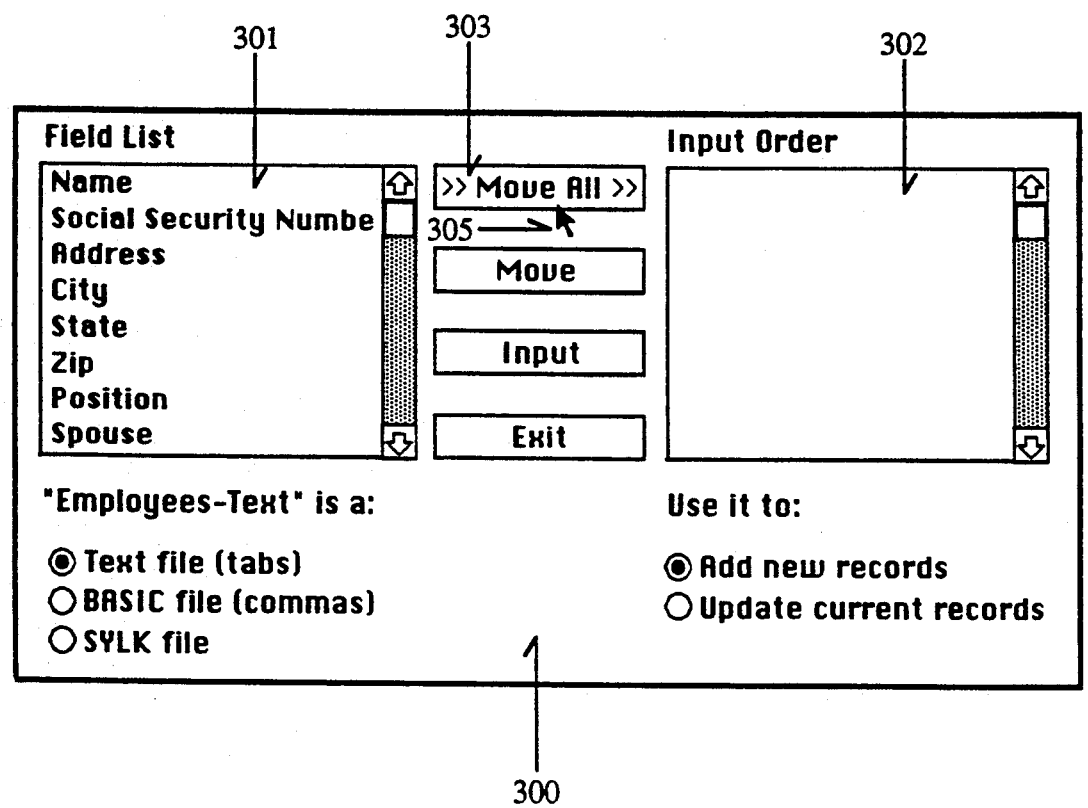
FIGS. 3A and 3B show a prior art interface for mapping fields from one database to another.
Figure 3B:
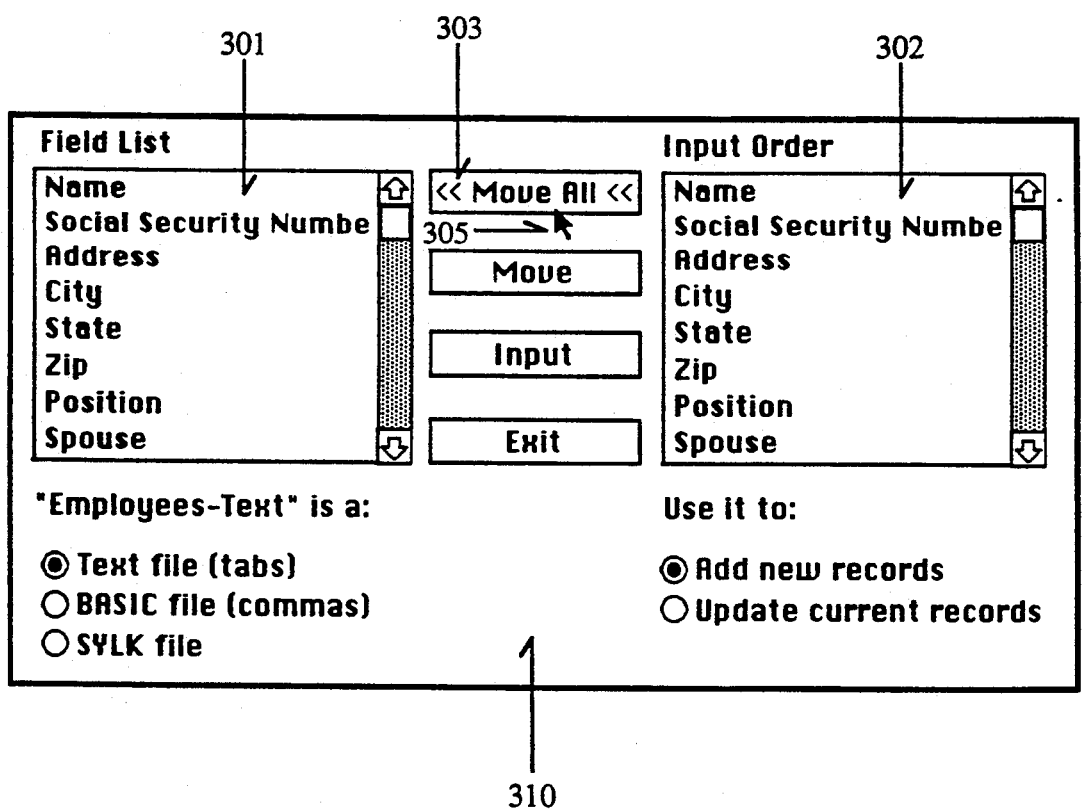
Figure 4:
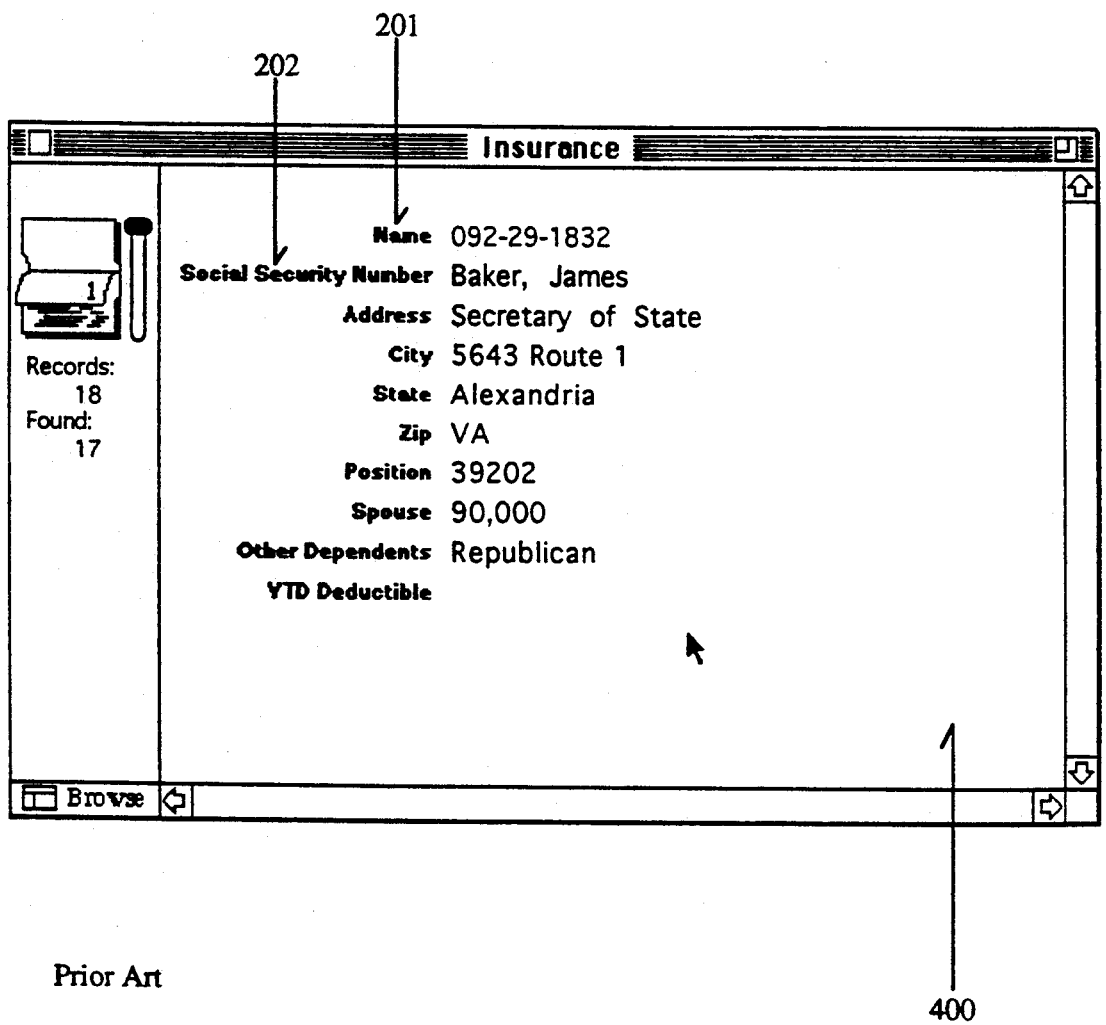
FIG. 4 shows the result of importing data using the screens shown in FIGS. 3A and 3B.
Figure 5:
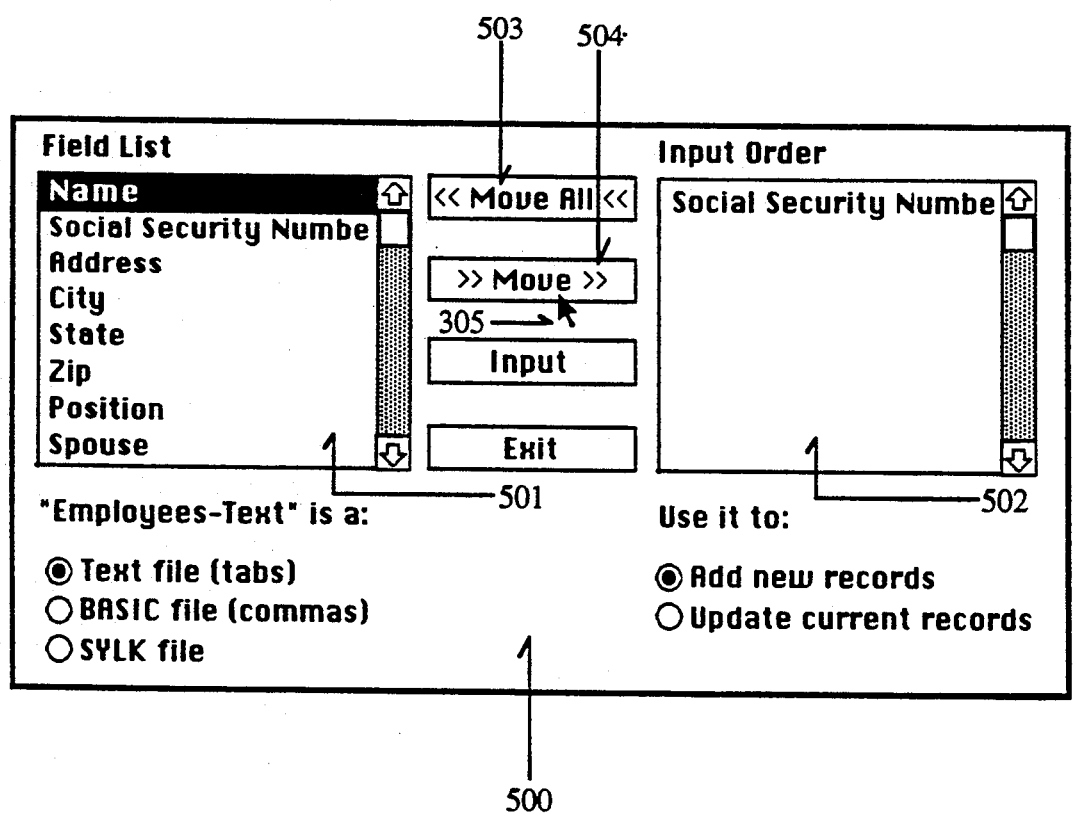
FIG. 5 shows one step used in the prior art for mapping data from one database to another.
Figure 6:
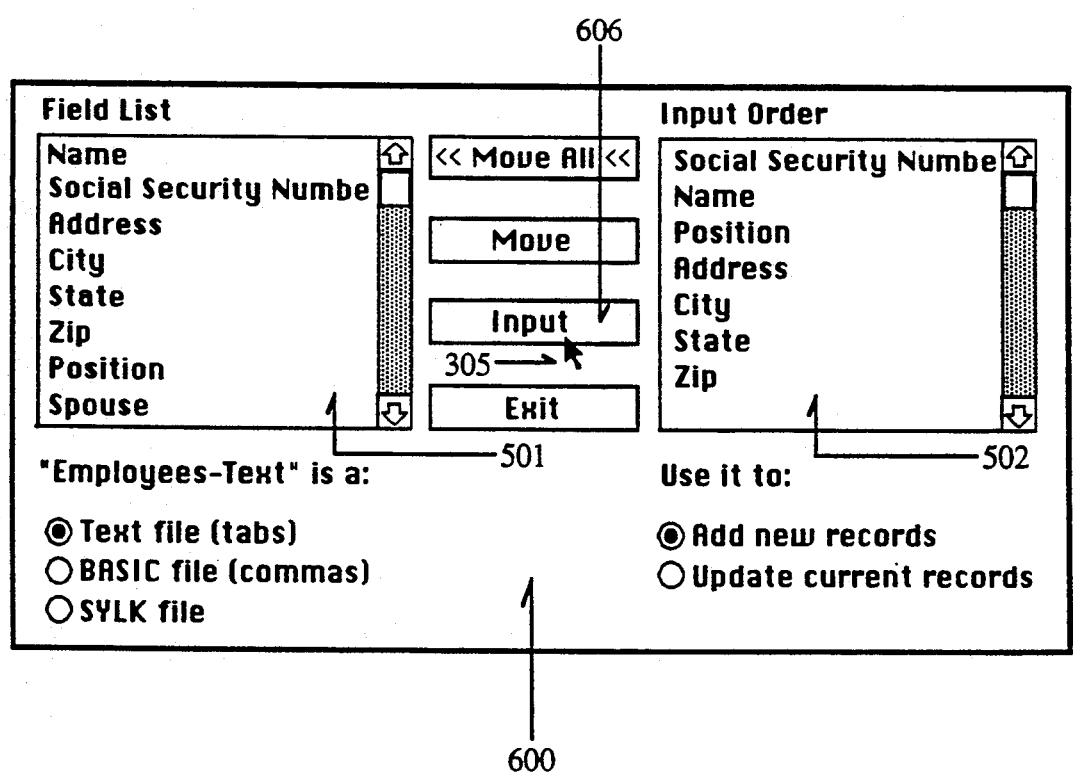
FIG. 6 shows another step in a prior art method of importing data from one set of data to another.
Figure 7:
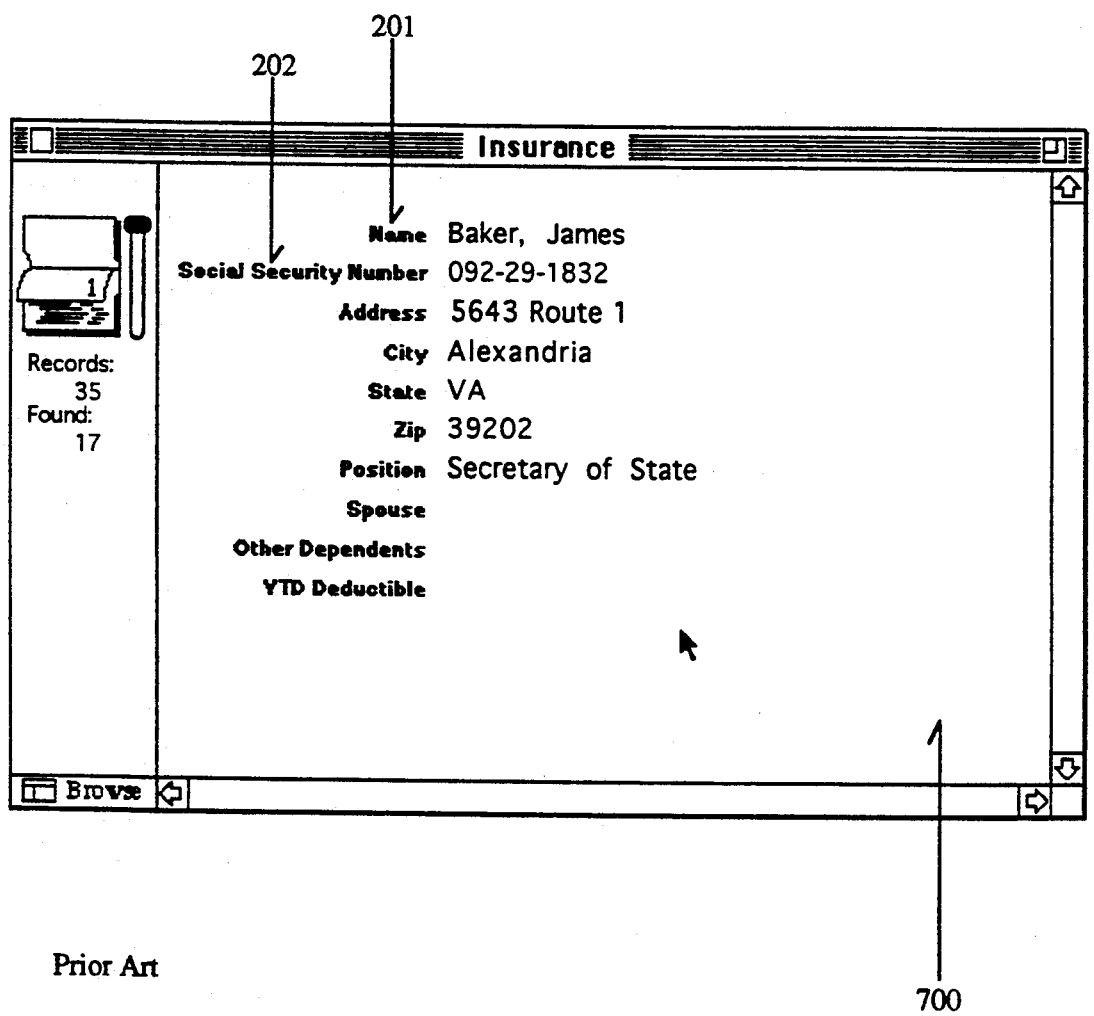
FIG. 7 shows a prior art result of properly importing data from one data set to another.
Figure 9A:
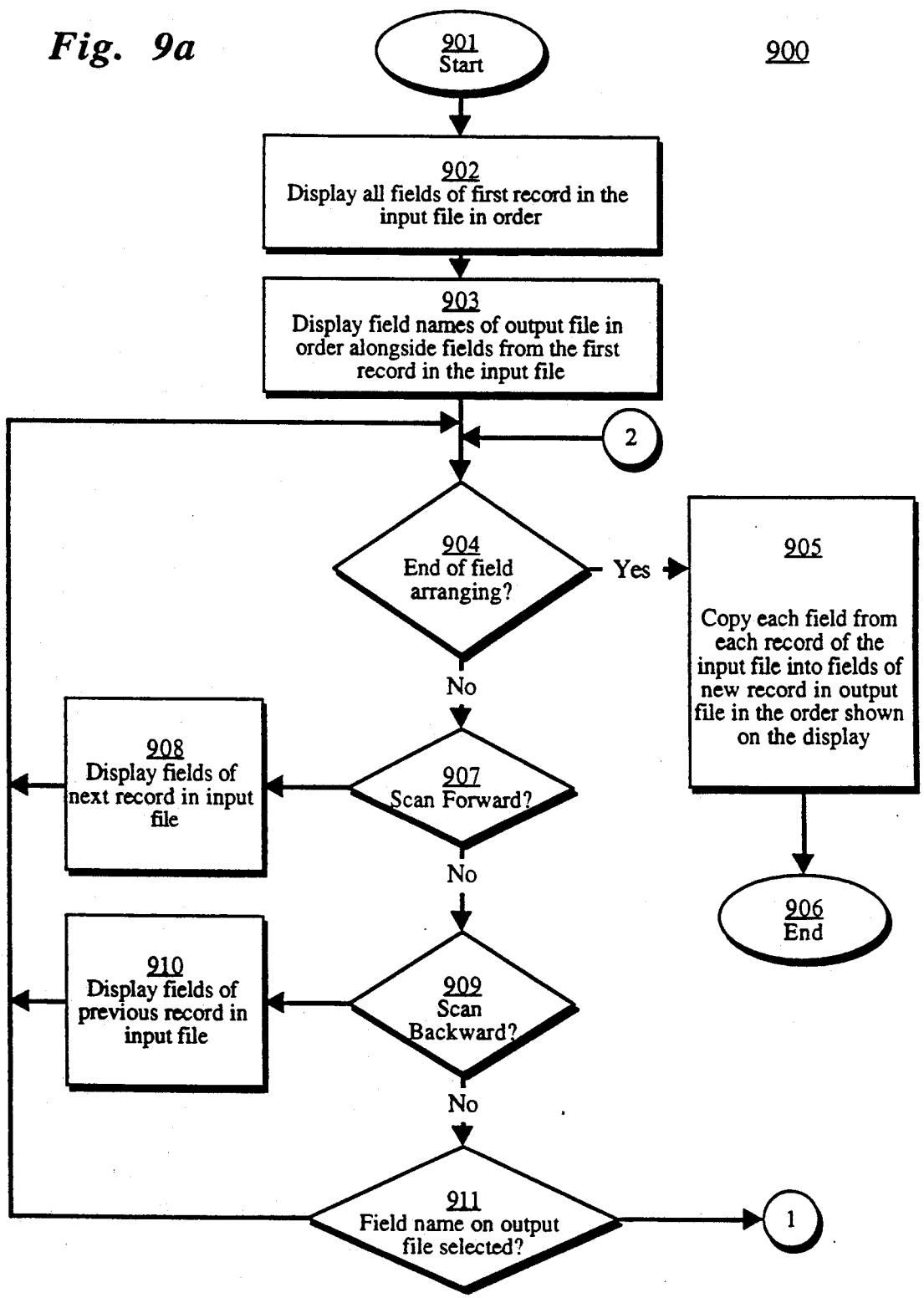
FIGS. 9A and 9B show the preferred embodiment's method for mapping fields from one set of data to another set of data.
Figure 9B:
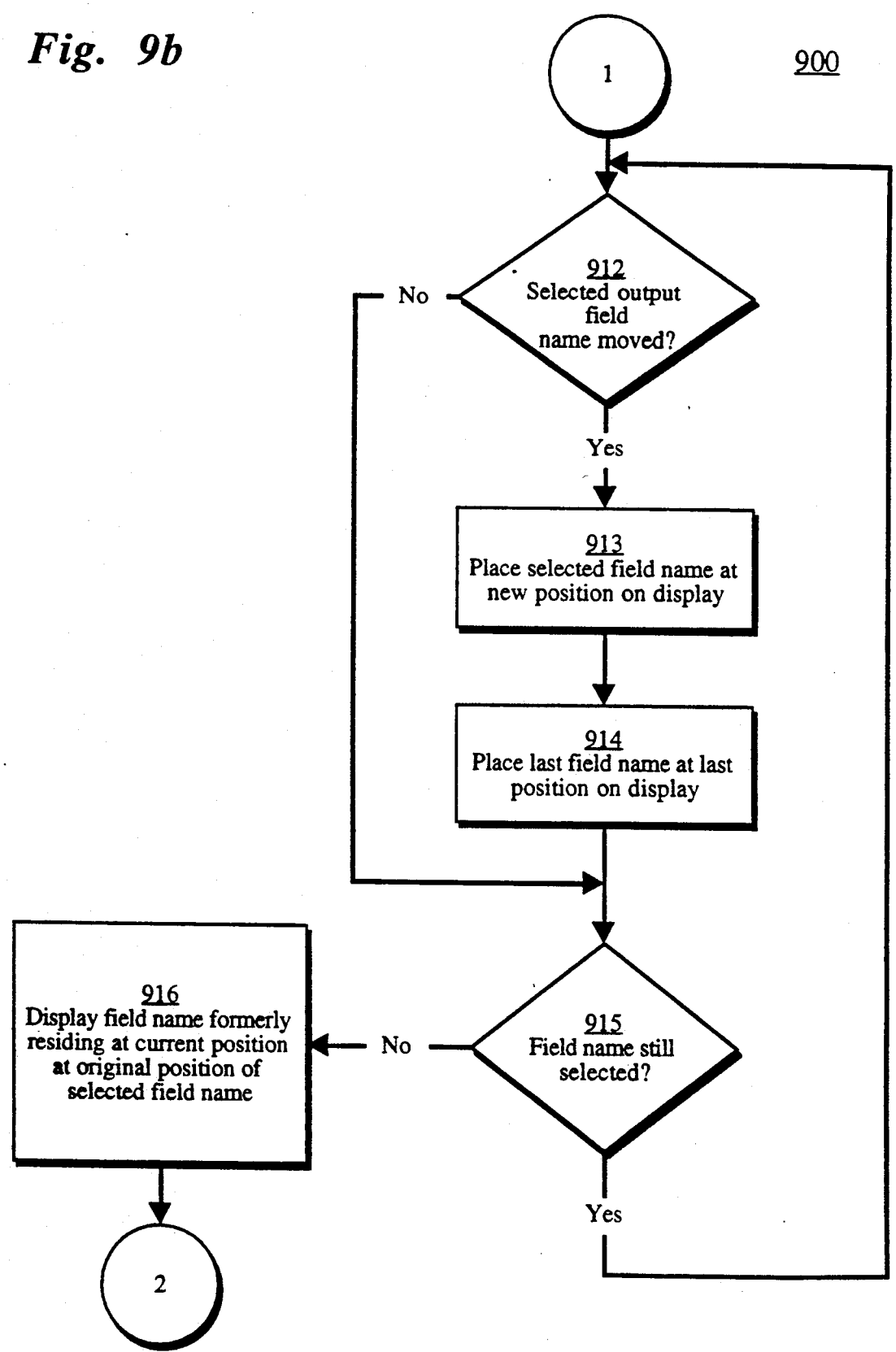

The method of the preferred embodiment is shown with reference to FIGS. 9A and 9B. Process 900 shows a preferred embodiment for corresponding fields from an input file containing fields which may be copied into an output file. Process 900 starts at step 901 in FIG. 9A and proceeds at step 902 to display all of the fields from the first record in the input file on a display in the order found in the input file. For instance, if one were to display the first record of the Employee database 100 shown in FIG. 1, then all of the fields of record 151 would be displayed, in their original order, on the computer system display. Process 900 then proceeds to step 903 wherein the field names of the defined output file are displayed alongside of the fields from the first record in the input file. Therefore, a correspondence between the order of the fields in the input file, and the order of the fields in the output file may be visually represented. The result of steps 901 through 903 is shown as screen 1000 of FIG. 10. As shown in FIG. 10, screen 1000 is divided into two windows 1001 and 1002. Window 1001 shows all of the fields 1003 of the first record from the input file. In this case, the input file comprises the same data as shown in Employee database 100 of FIG. 1. Fields 1003 are the same fields which comprise record 151 of database 100 in FIG. 1. Window 1002 is displayed next to window 1001 and shows the field names 1004 from Insurance database 200 as shown on screen 200 of FIG. 2. Notice that windows 1001 and 1002 are positioned next to one another such that data in the input file may be associated with the names of fields in the output file. As a further cue to the user, arrows 1005 show which data from the input file will be associated with particular fields in the output file. As shown on FIG. 10, each arrow directs each input field to an output field name for mapping purposes. As is shown on screen 1000, the order of the fields in the input file, and the output file as defined previously, is incorrect. If the user was to import data from output Employee database 100 into Insurance database 200 at this time, then the result would be the same as in 400 of FIG. 4. Therefore, the user will have to redefine the order of the fields in order for them to be a correct mapping or correspondence of fields from the input file to field names in the output file. This is accomplished by the remainder of process 900 shown in FIGS. 9A and 9B.

After step 903, process 900 proceeds to step 904 which tests to determine whether the user has completed rearranging the order of the fields as shown on the screen. This is determined, in the preferred embodiment, by moving the pointer 305 to button 1006 on screen 1000 and selecting. Selecting is accomplished in this embodiment by depressing a button on an input device, such as 850 on input device 823 in FIG. 8B. If the user has completed rearranging the order of the fields from the input file then process 900 proceeds to step 905 which reads in the fields from each record in the input file. Step 905 creates a new record in the output file for each record in the input file. It then copies each field from the input file into each field of the new record in the output file. The fields are copied in the order which was defined according to screen 1000. After step 905, process 900 proceeds to step 906 and process 900 is complete.

If step 904 detects that the user has not completed rearranging the order of the fields, that is, if button 1006 of screen 1000 is not selected then process 900 will proceed to step 907. Step 907 determines whether the user would like to view the next record in the input data file. This is determined, in the preferred embodiment, by selecting button 1101 as shown in FIG. 11 on screen 1100. Button 1101 is "selected" by placing the cursor 305 on the button 1101 and depressing mouse button 850, as discussed previously. Button 1101 indicates that the user would like to scan to the next record in the input data file. If the scan forward button 1101 is selected, then process 900 of FIG. 9A proceeds to step 908 wherein the fields of the next record in the input data file are displayed in window 1001. Of course, if the last record in the file is already displayed then there is no change in the fields displayed. As shown on screen 1100 of FIG. 11, the next record 152 from Employee database 100 of FIG. 1 is displayed on window 1001 as fields 1103. After the fields from the next record have been displayed at step 908, process 900 returns to step 904 in FIG. 9A.

If button 1101 has not been depressed, then process 900 proceeds to step 909 which determines whether process 900 should scan backwards in the data file. If button 1102 is selected using pointer 305, then process 900 proceeds to step 910 which will display the previous record of the input file. If this button is selected, then the previous record of the Employee database 100 of FIG. 1 is displayed in window 1001. If fields 1103 on FIG. 11 were displayed when the user selected the "scan back" button 1102 then the same fields 1003 which were displayed in FIG. 10 are redisplayed. If the file is currently at the first record in the input file, then the fields from the first record remain displayed on window 1001. Once the previous record in the input file has been displayed, process 900 returns to step 904.

Figure 12:
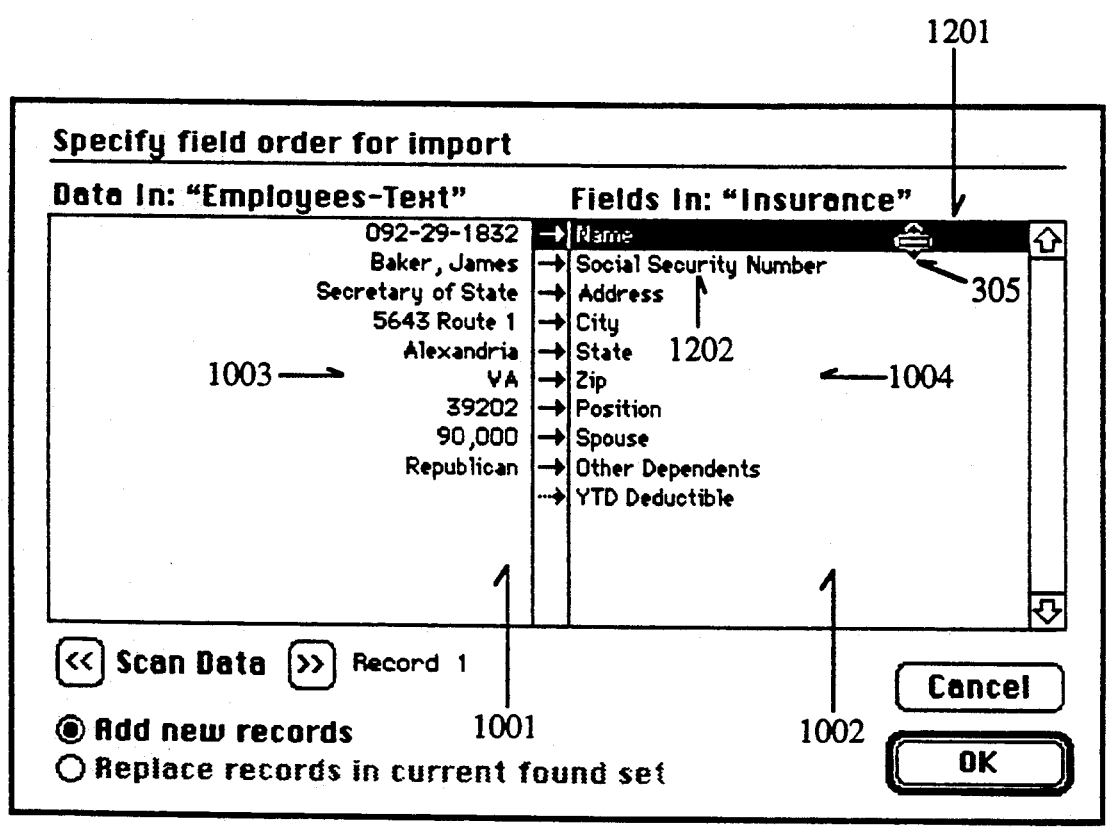
FIG. 12 shows a first step in moving a field to correspond with another field from one set of data to another set of data.

If neither the "scan forward" button 1101 nor the "scan back" button 1102 has been depressed, process 900 proceeds to step 911. Steps 911 through 914 are used to move the relative positions of fields on window 1002. This must be done so that if there is a different order of fields in the input file relative to the output file the input file may be imported in the correct order, matching the proper fields in the input file with the proper field names in the output file. Step 911 will determine whether a field name in the output file has been selected indicating that it is to be moved. This is accomplished, as shown in FIG. 12, when the user moves the pointer 305 at a field and selects it using an input device, such as button 850 on mouse 823. As shown in FIG. 12, cursor 305 has pointed at the line upon which the field name 1201 resides and the line has been selected as indicated by the highlighting. Highlighting is shown by displaying an object on the display in its inverse colors. Notice that name field 1201 on window 1002 of screen 1200 is currently associated with 1203 of the input file, the social security number field 101 from Employee database 100. Notice also that Social security number 1202 on the output file is currently associated with name field 102 from Employee database 100. When the user selects the field, this indicates that he wishes to move it to it's correct position relative to the input file. He will do this to associate it with the correct field in the input file window 1001. To move the field the user continues to select field 1201, by holding down mouse button 850, in the preferred embodiment, and releasing button 850 when the pointer resides at the location where the user wishes the field name to reside. Movement of the field name is detected by step 912 of process 900 shown in FIG. 9B. If step 911 determines that a field name on the output file has not been selected, then it returns to step 904, which will execute steps 904 through 909 in the manner described above.

If step 911 determines that a field on the output file displayed on window 1002 has been selected, then the field may be moved or rearranged in relation to the order of fields in the input file as displayed on the current record shown on window 1001. As mentioned previously, field name 1201 of the output file was associated with field 1203 of the input file, and field name 1202 of the output file was associated with field 1204 of the input file. If the selected output field is moved either upwards or downwards on window 1002 of screen 1200, then step 912 proceeds to steps 913 and 914 in FIG. 9B. Step 912 detects whether the field has been moved. If the selected output field has not been moved, however, then process 900 proceeds to step 915 of FIG. 9B which will determine whether the field name is still selected.

If step 912 determines that the selected output field name has been moved, by selecting the field name and moving the input device, then process 900 proceeds to move the field name in window 1002 in relation to the fields currently displayed in window 1001. When the cursor is moved while the field remains selected, steps 913 through 914 will replace the field name to which the cursor has been moved with the selected field name on window 1002. First, step 913 replaces the field name currently residing at cursor 305's position with the selected field name. In other words, if 1201 were moved to the position at which field name 1202 resides, a copy of 1201 would be placed into 1202's position. Then at step 914, the field name which resided at the previous position is redisplayed on window 1002. Since field name 1201 resided at the previous position, there is no change. As is shown on screen 1300 of FIG. 13, before the field is unselected (as indicated by a released mouse button 850), them will be two copies of the field name 1201 displayed on window 1002, one at the original field name position, and a second at the position where cursor 305 currently points.

Process 900 proceeds to step 915 which checks to see if the field name is still selected. If it is, then process 900 proceeds back to step 912 which again tests to determine whether the field name has been moved. If the field name has been moved again, then steps 913 and 914 are performed in the manner discussed above. If the field has not been moved, however, process 900 returns to step 915 to determine whether the field name is still selected. If the field name is not selected, that is, if mouse button 850 has been released, then process 900 proceeds to step 916. Step 916 will display the field name which formerly resided at the current cursor position into the original position of the selected field name. Thus, the moved field name now resides at the cursor location and the field name which formerly resided at the current cursor location, now resides at the original position of the selected field on window 1002. In other words, the two field names have been exchanged in window 1002. The result of steps 912 through 916 is shown in FIG. 14 as 1400. As shown on screen 1400 in FIG. 14, selected field 1201, the name field 201 from Insurance database 200, is now properly associated with the name field 1204 on the input data file, and field 1202, the social security number 202 from database 200 is now associated with field 1203, the social security number 101 from record 151 of Employee database 100.

When step 91 6 has completed, process 900 returns to step 904 and will execute steps 904 in FIG. 9A through 916 in FIG. 9B in the manner described above. Another example of moving a field is shown with reference to FIGS. 15 through 18. As shown on screen 1500 in FIG. 15, the selected field 1501 on window 1002 is desired to be associated with 1503 on window 1001. Also, zip field 1507 on window 1002 is desired to be associated with 1502 on window 1001. Therefore, the selected field 1501 is repetitively moved in an upward direction 1505 until it is associated with field 1503 on window 1001, temporarily replacing each of the field names on window 1002 en route to its destination. One step of this movement operation is shown in FIG. 16. Notice that as the field name has been moved in direction 1505 that position field name 1501 has now replaced the zip field name 1507 in window 1002. When field 1501 reaches the location associated with field 1503 of window 1001 and the mouse button is released, then address field name 1504 in window 1002, will be exchanged with field name 1501 such that address field 1504 is now associated with field 1502 as shown in FIG. 17. Now, address field name 1504 must be moved in a similar manner, as should the remainder of the field names in 1002 until they are all properly associated with the correct fields in 1001. The result of associating all of the input fields with the appropriate output field name is shown as 1800 in FIG. 18. As shown on 1800, field 1503 of window 1001 is now correctly associated with field name 1501 of window 1002, field 1506 of window 1001 is now associated with field name 1507 of 1002, 1502 of window 1001 is correctly associated with 1507 of window 1002, and the remainder of the fields are correctly mapped, completing the field rearrangement.

As an additional feature of the preferred embodiment, the user may select certain fields which will not be "mapped" or copied into fields in the output file. One result of this process is shown in FIG. 19 as screen 1900. Once all of the fields have been placed into their appropriate order as described with reference to process 900 of FIGS. 9A and 9B, some remaining fields may be "deselected" to disable the copying function. Screen 1900 shows two fields 1904 and 1905 which are associated with unrelated fields 1906 and 1907 in the input data file. Field 1904, a spouse field for the Insurance database 200, is associated with field 1906 representing salary 108 in record 151 of database 100. In addition, the "Other Dependents" field 1905 is associated with party field 109 as shown in database 100. Therefore, these two fields must be "deselected" such that no data will be transferred into them when the fields are copied from the input to the output file. This is accomplished when the user places cursor 305 at the arrow 1902, for instance, and depresses the mouse button 850 of FIG. 8 once in order to "ghost" out the arrow directing the field 1906 from the input data file to the output data field 1904. A "ghosted" display is accomplished by interspersing solid or continuous pixel values to one where every other pixel value is changed to correspond with the background color. A non-ghosted arrow is shown as 1901 on screen 1900, and ghosted arrows are shown as 1902 and 1903. The fields connected by ghosted arrows will not be copied from the input data file into the new output file which is created during the importation operation. In order to copy the fields from the input to the output file the user must select the "OK" button 1910. This generates a new file containing records such as the one shown on screen 2000 of FIG. 20.

Figure 20:
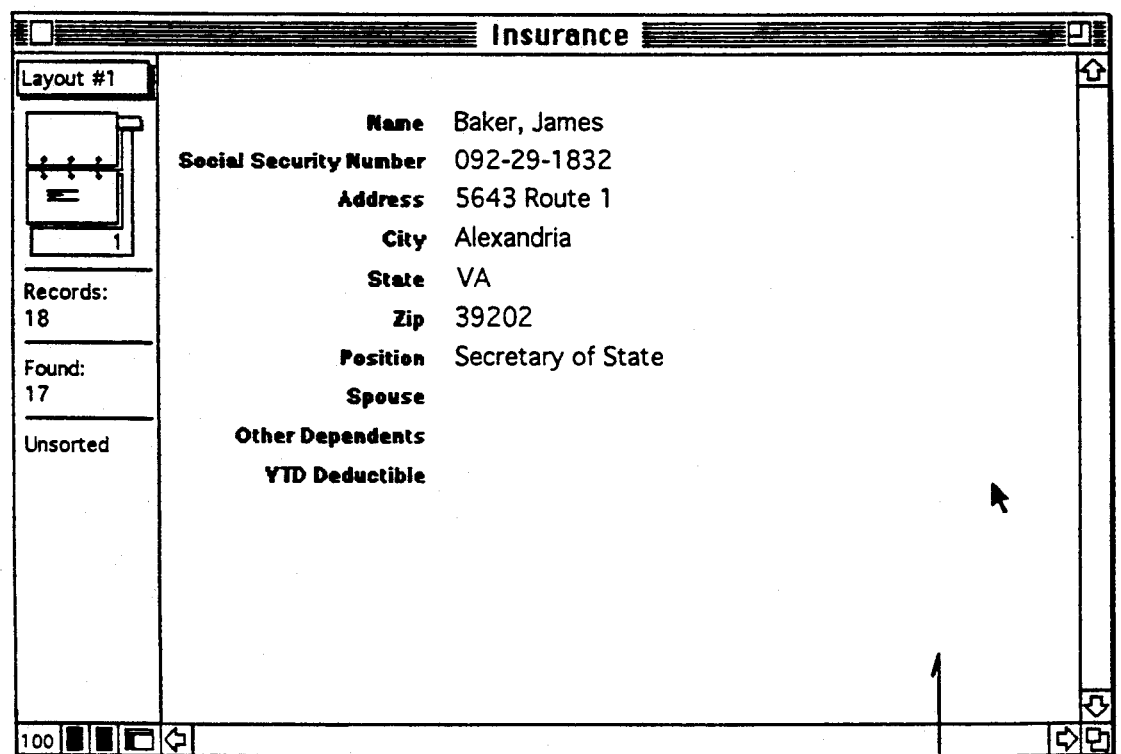
FIG. 20 shows one record after properly importing from one set of data to a second set of data.

The result of the foregoing operations is shown in FIG. 20. The record 151 from database 100 in FIG. 1 is shown in its final form displayed on screen 2000 in FIG. 20. Notice that all of the correct field names are associated with their correct values as copied from the input Employee database 100. Notice also that the fields which were "ghosted" as shown in FIG. 19 have no values associated with them. The user may place values into these fields at a later time. Note that the foregoing techniques allow the user to efficiently and with minimal effort insert data represented in a certain order from an existing data set into a new data set, such as a database or spreadsheet, in an order of the user's choosing.

In the foregoing specification the invention has been described with reference to specific embodiments thereof. It will, however, be evident that various modifications and changes may be made thereto without departing from the broad scope or spirit of the invention as set forth in the appended claims. The specification and drawings are, accordingly, to be regarded in an illustrative rather than a restrictive sense.

What is claimed is:

1. A method of associating an order of fields in records of a first database with an order of fields in records of a second database in a computer system comprising a display, a cursor control device for controlling a cursor on said display, and a selection device, comprising the following steps:
   a. sequentially displaying in a first column on said display data contained in each of the fields from a first record in the first database;
   b. sequentially displaying in a second column on said display field names of the fields from said records of the second database, said second column being adjacent to said first column, such that said data contained in each of the fields from the first record in the first database corresponds on the display with a field name from records of the second database;
   c. detecting a user selecting a first field name in the second column using said selection device, said first field name currently associated on said display with first data from a first field of said first record of said first database;
   d. detecting said user moving said cursor using said cursor control device while said first field name is selected using said selection device to a position of a second field name in said second column on said display, said second field name currently associated on said display with second data from a second field of said first record of said first database; and
   e. updating the display to exchange the position on the display of the first and second field names of records of said second database in said second column to show the first data from said first record of said first database associated with the second field name of said second database, and the first field name of said second database associated with the second data from said first record of said first database.

2. The method of claim 1 further comprising the steps of:
- a. detecting said user selecting a third field name in the second column using said selection device, said third field name currently associated on said display with third data from a third field of said first record of said first database:
- b. detecting said user moving said cursor using said cursor control device while said third field name is selected using said selection device to a position of a fourth field name in said second column on said display, said fourth field name currently associated on said display with fourth data from a fourth field of said first record of said first database; and
- c. updating the display to exchange the positions on the display of the third and fourth field names of said second database in said second column to show the third data from said first record of said first database associated with the fourth field name of said second database, and the fourth field name of said second database associated with the third data from said first record of said first database.

3. The method of claim 1 further comprising the step of creating new records for each of the records contained in the first database and subsequently copying each of the fields from each of the records in the first database to said new records, in an order defined by the association of the data from the first record displayed in the first column with the field names displayed in the second column of the display.

4. A method of associating an order of fields in records of a first database with an order of fields in records of a second database in a computer system comprising a display, a cursor control device for controlling a cursor on said display, and a selection device, comprising the following steps:
- a. sequentially displaying in a first column on said display data contained in each of the fields from a first record in the first database;
- b. sequentially displaying in a second column on said display field names of the fields said records of the first database, said second column being adjacent to said first column, such that said data contained in the fields from the first record in the first database corresponds on the display with a field name from records of the second database;
- c. sequentially displaying in said first column on said display data contained in each of the fields from a second record in the first database;
- d. detecting a user selecting a first field name in the second column using said selection device, said first field name currently associated on said display with first data from a first field of said second record of said first database;
- e. detecting said user moving said cursor using said cursor control device while said first field name is selected using said selection device to a position of a second field name in said second column on said display, said second field name currently associated on said display with second data from a second field of said second record of said first database; and
- f. updating the display to exchange the positions on the display of the first and second field names of said records of said second database in said second column to show the first data from said second record of said first database associated with the second field name of said records of said second database, and the first field name of said records of said second database associated with the second data from said second record of said first database.

5. An apparatus for associating an order of fields in records of a first database with an order of fields in records of a second database in a computer system comprising a display, a cursor control device for controlling a cursor on said display, and a selection device, comprising:
- a. means for sequentially displaying in a first column on said display data contained in each of the fields from a first record in the first database;
- b. means for sequentially displaying in a second column on said display field names of the fields from said records of the second database, said second column being adjacent to said first column, such that said data contained in each of the fields from the first record in the first database corresponds on the display with a field name from records of the second database;
- c. means for detecting a user selecting a first field name in the second column using said selection device, said first field name currently associated on said display with first data from a first field of said first record of said first database;
- d. means for detecting said user moving said cursor using said cursor control device while said first field name is selected using said selection device to a position of a second field name in said second column on said display, said second field name currently associated on said display with second data from a second field of said first record of said first database; and
- e. means for updating the display to exchange the positions on the display of the first and second field names of records of said second database in said second column to show the first data from said first record of said first database associated with the second field name of said second database, and the first field name of said second database associated with the second data from said first record of said first database.

* * * * *